April 11, 1944. W. B. BOICE 2,346,146
WOODWORKING MACHINE
Original Filed March 17, 1939   2 Sheets-Sheet 1

Inventor
WILLIAM B. BOICE
Attorney

April 11, 1944.　　　　W. B. BOICE　　　　2,346,146
WOODWORKING MACHINE
Original Filed March 17, 1939　　2 Sheets-Sheet 2

Inventor
WILLIAM B. BOICE
By
Alfred F. Dees
Attorney

Patented Apr. 11, 1944

2,346,146

UNITED STATES PATENT OFFICE 2,346,146

WOODWORKING MACHINE

William B. Boice, Toledo, Ohio

Original application March 17, 1939, Serial No. 262,432. Divided and this application March 10, 1942, Serial No. 434,151

7 Claims. (Cl. 143—132)

This invention concerns wood-working machinery and more specifically relates to a sawing machine capable of making a plurality of bevel or straight cuts as either a cut-off saw or as rip saw and to a table top for such machine.

The object of this invention is to provide a table or working surface on the machine that is equipped with a variable width slot and which will still give full support to the work piece in any position relative to the saw or cutter.

Another object of the invention is to provide the working surface of a machine table top with a variable width cutter slot that will accommodate the cutter in any angular or vertical adjustment of the cutter relative to the table top.

Other objects of the invention will occur to those skilled in the arts to which this invention pertains as the description proceeds which taken with the accompanying drawings sets forth a preferred embodiment thereof but such disclosure is not to be construed as a limitation of the invention which is limited only by the appended claims and any and all modifications, alterations and variations of structure coming within the spirit and scope thereof are deemed to be included herein.

Figure 1:
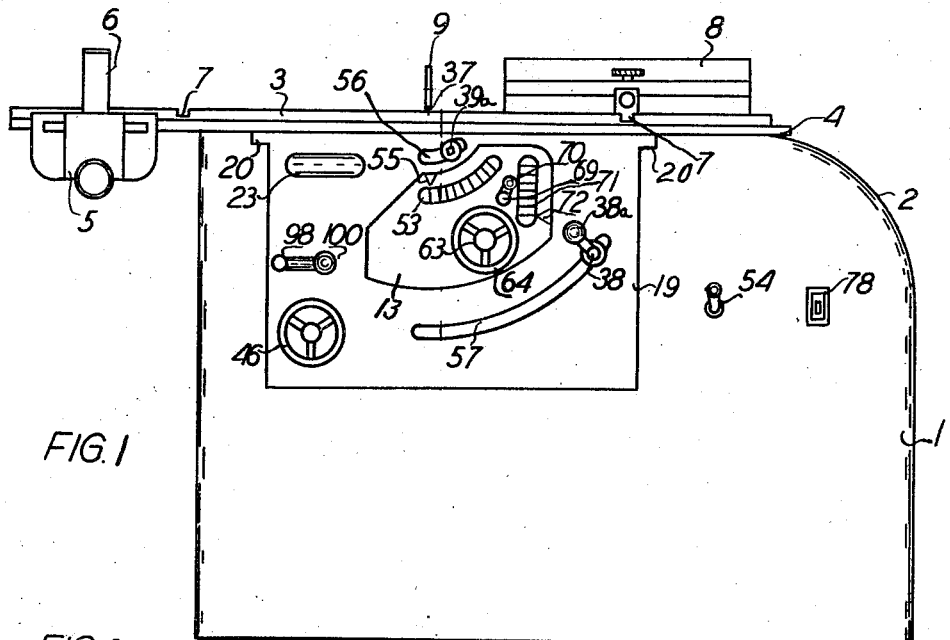
Fig. 1 shows a front elevational view of a wood-working machine incorporating the invention.

This invention is a division of application Serial Number 262,432, filed March 17, 1939.

The wood-working machine of the instant invention comprises initially a base structure 1 which is of a substantially rectangular shape but having a curved surface as at 2. On the upper part of the base structure there is arranged a table top or work supporting surface 3 preferably integrally associated with the base structure 1. At one edge, preferably the forward edge, a fence support 4 is mounted which supports fence locking and adjusting mechanism 5 with which the fence 6 is intimately associated. The details of the fence support and its associated mechanism is set forth more particularly in United States Patent No. 2,256,607, issued September 23, 1941.

The table top or work supporting surface 3 is provided with a plurality of grooves 7 into one of which a work guide 8 is adjustably secured to assist in the making of angular cross cuts in a work piece. The cutter 9 is rotatably supported in a carriage 19 and is intended to be moved bodily through a work piece to perform a cross cutting operation on the work piece when it is at rest against the guide 8. Provision must therefore be made for a slot 10 in the table top 3 to enable a saw or cutter 9 to be pulled through the work. Since it is also intended to operate the machine with a dado cutter provision has been made to vary the width of the slot 10 to enable various combinations and widths of cutters to be employed. The essential object of the adjustable width slot is to permit a work piece to be supported right up against the cutter and to prevent any possible tipping of the work piece so as to cause it to become jammed between the cutter and the edge of the slot.

Figure 2:
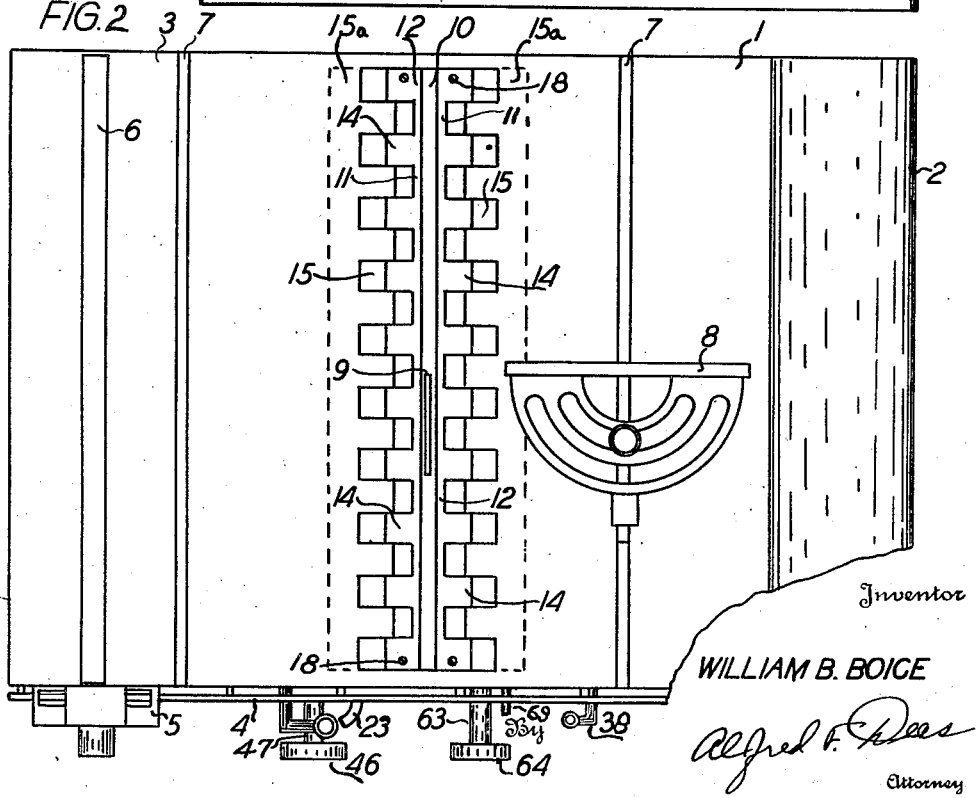
Fig. 2 shows a top plan view of the woodworking machine shown in Fig. 1.
Figure 3:
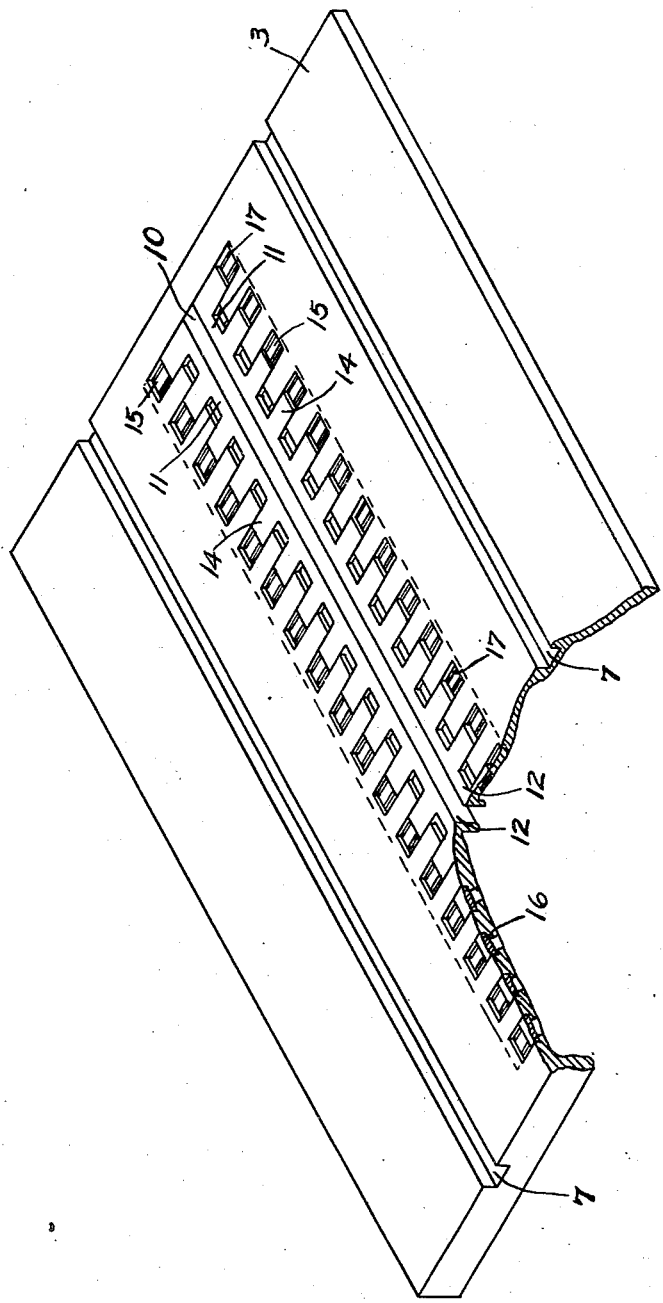
Fig. 3 is a perspective view of the table top shown in Fig. 2.

The foregoing results are accomplished in the provision of a pair of adjustable slot wall members 11, 11 that are mounted in the table top 3. The detail of these members is shown more clearly in Fig. 3. It will be apparent that each of the members comprise initially a long relatively narrow bar member 12. The bar member 12 has integrally associated therewith a plurality of tooth or leg members 14 which cooperate with corresponding slots 15 in the table top 3 or in a separate piece 15a insertible in the table top as indicated by the dotted lines in Fig. 2. Each of the leg or tooth members 14 is shouldered as at 16. This results in providing a slot of somewhat narrower width than the corresponding leg or tooth. The slots 15 cut into the table top or in the separate piece 15a are likewise shouldered as at 17, 17. When therefore the member 11 is fitted into the table top the teeth or legs 14 of movable members 11 will fit into the slots 15 of the table top. The shoulders 16 and 17 cooperate to maintain the top of the table and the top of the tooth bar members 11 and 12 flush. Attention is at this point invited to the fact that the bar member 11 of the toothed portion 14 can be brought into close proximity with the saw or cutter. It should be further evident that a work piece laid on the table top in working or cooperative relation with the saw will be supported throughout the full length of the table because the teeth of the movable element will provide the intermediate support as the toothed member is adjusted relatively of the saw or cutter. The bar element 11 will provide a firm support immediately along side of the cutter. A pair of locking screws 18, 18 may be provided in each of the toothed elements 11 and 11 in any desired adjusted position.

The carriage 19 has projections 20, 20 thereon which cooperate with appropriate ways formed in the bed 1. A handle 23 fixed to the carriage 19 is for the purpose of moving same in the channel. The cutter 9 is mounted for swinging and vertical adjustment in a carrier 13 whose axis of swing 37 lies in the upper plane of the table 3 and in the plane of the cutter 9. One wall, or the forward wall of the carrier 19 has slots 56 and 57 formed therein with which locking means 39a and 38, 38a cooperate to hold carrier 13 in adjusted position. Appropriate means for vertically adjusting the cutter are provided (not shown) but which are shown in detail in the application from which this case is divided. 46, 47 is the operator's end of a control with which to swing the carrier 13 and 69, 70 is the operator's end of a locking device for the vertical adjustment of the cutter and 63, 64 is the operator's end of the mechanism for vertically adjusting the cutter. 54 is the operator's end of a switch for controlling illuminated indicia 53 and 71 that cooperate with pointers 55 and 72. 76 is a switch for governing the rotation of the cutter and 98 and 100 is the operator's end of a locking device for the carriage 19 which holds the carriage during a ripping operation. The various details of the above are more fully set forth in the application referred to above but for the purposes of the instant case it is only essential to know that the several adjustments are possible and that the adjustable saw slot will provide work support adjacent the cutter during any positional adjustment of the saw.

That which is regarded new, novel and useful and which is sought to be protected by Letters Patent of the United States is as follows:

1. In a wood working machine; a base; a work supporting means on said base; a cutter movable relative to said base and supported in a carriage; means to tilt and vertically adjust said cutter; adjustable means on said work supporting means adapted to fully support work adjacent said cutter irrespective of the width of said cutter, said means comprising a plurality of toothed structures formed in said work supporting means; a bar member adjacent to and parallel to the plane of said cutter on each side thereof and movable toward and away from said cutter relatively of said base, each said bar having toothed members interfitting with a corresponding one of said toothed structures of said work supporting means, each interfitting set of a toothed member and toothed structure being maintained in a telescoping relationship and adapted to support work immediately adjacent said cutter irrespective of the width of the cutter.

2. In a wood working machine, the combination; a work top integral with said machine and having a substantially central longitudinal opening with an inwardly directed toothed portion at each side thereof; a relatively movable, tiltably and vertically adjustable cutter in said opening; an adjustable member parallel to the plane of said cutter in said top adjacent said cutter on each side thereof providing the walls of a slot in which said cutter is movable, said adjustable members providing a support for a work piece immediately adjacent said cutter and for the full length of cutter movement irrespective of the thickness or diameter of said cutter, each said adjustable member having a toothed portion interfitting with a toothed portion in said top, said toothed portions being so constructed and arranged that the upper surfaces are flush; and means for maintaining said members in adjusted position relative to said cutter and work top.

3. A wood working machine with an adjustable saw slot; a saw movable within said slot; a machine top in which said slot is provided comprising a plurality of members extending parallel to the plane of said saw adjustable relatively of each other in a horizontal plane; means on said adjustable members interfitting with means on said top whereby said members are movable relatively of said top, said means including toothed members on said top and members; said means adapted to completely support a work piece on said top immediately adjacent a cutting tool and to prevent tipping of said work piece.

4. In a work table top with an adjustable cutter slot; a cutter movable within said slot; toothed formations in said top; a bar member disposed parallel to said cutter; toothed formations on said bar member; said toothed formations on said bar and in said top telescopically interfittingly slidable with respect to each other when said slot is varied in width; said bar member supporting a work piece substantially the entire length of said top and said toothed formations being flush with said table top.

5. In a machine work table top having an adjustable cutter slot; a cutter movable within said slot; tooth formations in said top extending towards each other and disposed in an opening in said top; a pair of bar members in said opening providing the walls of said cutter slot between them and extending longitudinally of said opening; tooth elements on said bar members; and said tooth elements on said bar and said table top telescoping relatively of each other when said bar members are moved relatively of each other when said slot width is varied.

6. In a device as set forth in claim 4 wherein said toothed formations are shouldered to provide more rigid support for said members.

7. In a saw machine; a saw machine having a work top with a slot therein and a cutter disposed in said slot; tooth elements fixed to two of the walls of said slot and extending toward each other; two allochiral bar elements supported lengthwise in said slot on opposite sides of the cutter; tooth elements on the side of each of said bar elements away from said cutter; said slot tooth elements telescoping with said bar tooth elements; and said telescoping tooth elements and their associated bar elements supporting a work piece entirely across said table top and immediately adjacent said cutter.

WM. B. BOICE.